Dec. 26, 1939. R. F. SCHMALTZ 2,185,065
FISHING TACKLE
Filed Oct. 4, 1938

Robert F. Schmaltz, INVENTOR
BY Victor J. Evans & Co.
ATTORNEYS

Patented Dec. 26, 1939

2,185,065

UNITED STATES PATENT OFFICE 2,185,065

FISHING TACKLE

Robert F. Schmaltz, Muskegon Heights, Mich.

Application October 4, 1938, Serial No. 233,318

2 Claims. (Cl. 43—52)

My invention relates to fishing tackle and more particularly to sinkers adapted for use in connection with trolling.

One of the principal objects of my invention is to provide a sinker equipped with means enabling said sinker to be trolled over obstructions and the like in a manner to preclude said sinker being accidentally caught thereby.

Another object of my invention is to provide a sinker of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views.

Figure 1:
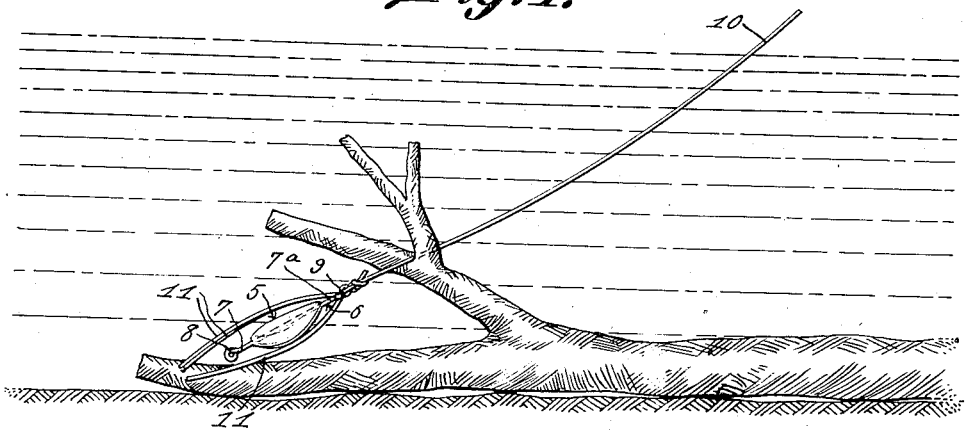
Figure 1 is a side elevation of my invention illustrating the same in an operable position.

My novel form of sinker comprises an elongated body 5 of a substantially ovate configuration in elevation and is fashioned with a rod 6 extending therethrough, the lower end 7 of which is provided with an eye 8. The upper end 7a of the rod 7 terminates within an eyed clip 9 fixed thereto and adapted to be secured to the lower end of a leader 10. A ternary of resilient rods constituting guards 11 are rigidly secured at their upper ends within the clip 9 and the lower end of said guards extend an appreciable distance below the eye 8 of the rod 6 as clearly illustrated in Figures 1 and 2 of the drawing. The guards are of an arcuate configuration whereby their lower ends are adapted for crossed engagement with each other.

Figure 2:
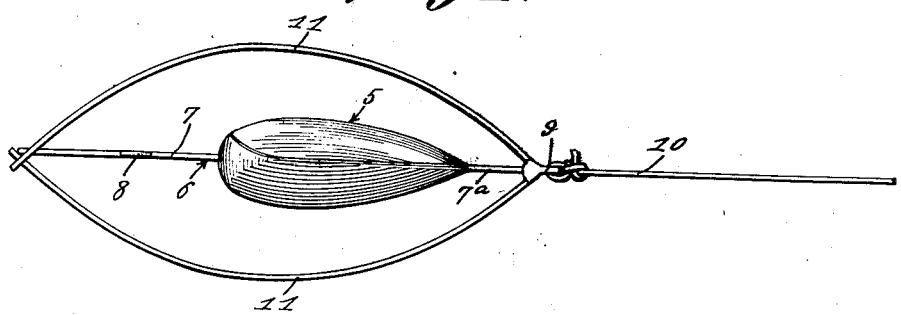
Figure 2 is a side elevation thereof on an enlarged scale.

In operation, the sinker is attached by means of the clip 9 to the lower end of a leader 10 and may be trolled over the bottom or bed of a body of water. Due to the arrangement of the guards about the body 5, the sinker will slide freely over obstructions and between crotches of trees and the like, for instance as illustrated in Figure 1, thereby making it an ideal sinker for deep trolling. It is to be understood, that when the sinker is drawn through the crotch of a tree or through a relatively small space between obstructing objects, the guards will be compressed towards each other and overlie the body to protect said body from being caught between said objects and thereby permit the sinker being readily and freely trolled thereover.

When the sides of the guards engage the aforementioned objects, the lower ends thereof will be actuated outwardly for like engagement with said objects and thereby tend to move the sides of said guards into yieldable engagement with the objects to isolate the body from said objects.

Figure 3:
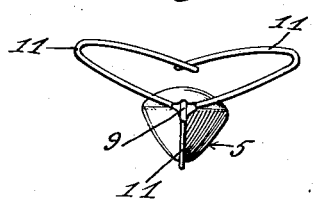
Figure 3 is a top plan view thereof.

My novel sinker is especially adaptable for river fishing in that it is of the non-rolling type, thereby preventing winding or twisting of the line caused by the flow of the current. By reference to Figure 3 of the drawing it will be noted that the rod 6 is disposed through one side of the body in proximity to the outside face thereof which is closer to the guard than the other faces and said guards coact with the last mentioned faces to prevent rolling of the sinker. When used in connection with river fishing the sinker is attached below the hook leader and thereby permits the hook and hook leader to be disposed above the sinker.

It is to be distinctly understood that various changes and modifications may be resorted to in the construction and arrangement of my invention without departing from the spirit of the latter or the scope of the appended claims.

What I claim is:

1. A trolling sinker, comprising, a body, a rod connected to said body and extending beyond one end thereof, and a plurality of resilient guards connected to said rod and embracing said body and normally spaced therefrom, said guards being operable in a direction toward said body to protect the latter from engagement with obstructions when trolled thereover.

2. A trolling sinker, comprising, a body, a rod connected to said body and extending beyond one end thereof, and a plurality of resilient guards embracing said body and normally spaced therefrom and having ends connected to said rod adjacent said body, said guards being operable in a direction toward said body to protect the latter from engagement with obstructions when trolled thereover, said guards being of an arcuate configuration to provide crossed ends adjacent the opposite end of said body whereby upon movement of said guards toward said body said lower ends will extend beyond the sides of said body to engage obstructions and move said guards outwardly of said body to isolate the latter from said obstructions.

ROBERT F. SCHMALTZ.